United States Patent [19]
Trifiletti et al.

[11] Patent Number: 5,726,852
[45] Date of Patent: Mar. 10, 1998

[54] MODULAR DC DISTRIBUTION UNIT AND SYSTEM

[75] Inventors: Richard E. Trifiletti, Lorain; John J. Drabczyk, Brooklyn, both of Ohio

[73] Assignee: Reltec Corporation, Lorain, Ohio

[21] Appl. No.: 717,482

[22] Filed: Sep. 20, 1996

[51] Int. Cl.⁶ ..................................... H02B 1/04
[52] U.S. Cl. ................ 361/115; 361/636; 361/646; 361/656
[58] Field of Search ....................... 361/102, 104, 361/105, 628, 630, 633, 634, 636, 656, 673, 642, 646, 652; 439/929, 948

[56] References Cited

U.S. PATENT DOCUMENTS

| | | |
|---|---|---|
| 3,619,727 | 11/1971 | Hackenbroch . |
| 3,748,629 | 7/1973 | Price . |
| 4,004,197 | 1/1977 | Hawkes, Jr. . |
| 4,080,644 | 3/1978 | Reed et al. . |
| 4,181,924 | 1/1980 | Thomas et al. . |
| 4,198,107 | 4/1980 | Luke et al. . |
| 4,432,594 | 2/1984 | Daggett . |
| 4,473,269 | 9/1984 | Belttary . |
| 4,475,783 | 10/1984 | Borzoni . |
| 4,538,879 | 9/1985 | Wagener . |
| 4,639,819 | 1/1987 | Kirby . |
| 4,642,733 | 2/1987 | Schacht . |
| 4,722,701 | 2/1988 | Bradt . |
| 4,874,321 | 10/1989 | Wagener et al. . |
| 5,113,312 | 5/1992 | Pratt et al. . |
| 5,148,139 | 9/1992 | Dingle et al. . |
| 5,166,861 | 11/1992 | Krom . |
| 5,439,396 | 8/1995 | Magadeleno . |
| 5,486,979 | 1/1996 | Bowen et al. . |

Primary Examiner—Jeffrey A. Gaffin
Assistant Examiner—Michael J. Sherry
Attorney, Agent, or Firm—Fay, Sharpe, Beall, Fagan, Minnich & McKee

[57] ABSTRACT

A modular DC distribution unit including a block assembly configured to be plugged or inserted into a backing panel such that no tools are necessary. Circuit breaker modules and fuse modules which are to be inserted into the block assembly are constructed to be interchangeably located in the block assembly, without the need of any tools. The fuse module being a two part device having an interior assembly carrying the fuse and an outer carrier into which the interior assembly is inserted. The outer carrier of the fuse module also having a replacement fuse carrier configured to carry a replacement fuse. The module DC distribution unit also including a shunt module to output a shunt current to a monitoring location.

20 Claims, 10 Drawing Sheets

MODULAR DC DISTRIBUTION UNIT AND SYSTEM

BACKGROUND OF THE INVENTION

The present invention relates to power distribution and more particularly to modular DC distribution units having interchangeable circuit breaker and fuse modules which are plugged into a block assembly of the modular DC distribution unit. When a number of the modular DC distribution units are used in a distribution system each unit outputs a shunt current which is transmitted to a monitoring location. The block assembly being snap fitted into an engaged position with a bus bar without the need of tools and without the need of moving the bus bar.

Existing power distribution systems include the use of circuit breaker and fuse modules. Examples of such teachings are found in patents to Magdaleno (U.S. Pat. No. 5,439,396), Dingle, et al. (U.S. Pat. No. 5,148,139), Bowen, et al. (U.S. Pat. No. 5,486,979) and Hawkes, Jr. (U.S. Pat. No. 4,004,197). The Magdaleno, Dingle, et al. and Hawkes, Jr. patents implement a clip located on the modules which interconnect with a projecting element of a bus. A drawback of such systems, especially in the Magdaleno patent, is the exposure of the clipping element to the environment when the modular unit is not attached to the bus bar. During these times it is more likely that such a flexible element will become bent or damaged especially in industrial type settings. Bower, et al. discloses stab type connectors which are inserted into connection with the bus bar.

Dingle, et al. '139 notes that one benefit of the fuse switch unit described therein is that it extends the usefulness of such arrangements by providing fuse switch units which may be plugged into the bus bars as an interchangeable alternative to circuit breakers. Dingle, et al., however, discloses an unrestricted type bus bar arrangement where the fuse switch units can be connected at any location along the bus bar and are connected and carried directly on the bus bar. Dingle, et al. is not, therefore, concerned with circuit breaker, fuse assembly where the insertion of the circuit breaker and fuse modules are restricted to specific pre-defined insertion or attachment locations.

In reviewing existing power distribution systems, the inventors noted the lack of a modular DC power distribution system including circuit breaker and fuse modules which are interchangeable in a block assembly having specific pre-defined areas for insertion or attachment and is easy to mount and insert in a modular DC distribution unit without the use of tools, but rather simply through snapping the block assembly into a holding element such as a panel board and inserting the modules into the block assembly.

While Magdaleno does disclose an adaptor 100 which may be fastened without the use of a tool to a sheet metal backing panel, Magdaleno requires adaptor 100 be mounted prior to insertion of bus bar 30 into guideway 150. A drawback of such a construction is that if adaptor 100 is to be removed, it is necessary to also remove bus bar 30. It is also observed that adaptor 100 does not carry circuit breaker 20, rather the adaptor simply provides for connection of the bus 30 and provides a path to the load through use of copper mold insert 108.

Following the review of existing distribution units, the inventors determined that it would be beneficial to develop a modular DC distribution unit having a block assembly attached to a distribution unit and bus bar without the use of tools and which may be removed without removal of the bus bar, and where circuit breaker and fuse modules are interchangeably inserted into the block assembly.

It was also believed to be advantageous to provide a two part fuse assembly having an inner-assembly carrying the fuse and an outer carrier which is inserted into the block assembly. The inner-assembly being removable from the outer carrier such that a fuse is changed without removal of the outer carrier from the block assembly. In order to facilitate fuse replacement, it was considered desirable to provide replacement fuse carrier as part of the outer carrier.

It was further determined beneficial to provide each of the modular DC distribution units with a current shunt so that as additional DC distribution units are added to an assembly the current shunts from each of the modular DC distribution units are transmitted to a monitoring location.

SUMMARY OF THE INVENTION

The present invention contemplates a new and improved modular DC distribution unit that overcomes all of the above noted problems and others. In accordance with one aspect of the present invention, a modular DC distribution unit is provided where a block assembly is configured to snap or plug into position without the use of tools, such that a mating relationship is formed between the block assembly and a bus bar. Interchangeable circuit breaker and fuse modules which may be snapped or plugged into the block assembly are provided wherein the modules use stab type connectors to contact the bus bar and to connectors to external loads.

According to a more limited aspect of the invention, the fuse module is configured of two elements including an inner-assembly carrying a fuse and an outer carrier for connection to the block assembly. The inner-assembly being insertable into the outer carrier whereby the fuse is connected to the circuit of the DC distribution unit. The carrier portion further being constructed with an external fuse storage element for carrying a replacement fuse.

In a more limited aspect of the invention, the block assembly includes extending flexible fingers which snap into recessed locking areas of the circuit breaker and fuse modules for secure locking of the circuit breaker and fuse modules to the block assembly.

In accordance with another aspect of the present invention, a DC distribution system is provided including a plurality of modular DC distribution units each including a shunt current output which allows each shunt current value to be sent to a monitoring location.

A principal advantage of the invention is the provision of a modular DC distribution unit which is used in a DC distribution assembly whereby expansion of the assembly is easily accomplished.

Another advantage of the invention resides in the ease with which the block assembly is fastened to a backing panel such that a close mating relationship between a bus bar and the block assembly is accomplished.

Another advantage of the present invention is that the block assembly is removable without disturbing the bus bar of the modular DC distribution unit.

Still another advantage of the present invention is the provision of circuit breaker and fuse modules which are interchangeable within the pre-defined insertion areas of the block assembly, and are securely held within the block assembly through an engagement of resilient fingers of the block assembly and locking areas of the modules.

Still a further advantage of the present invention is use of a fuse module having an inner-assembly and an outer carrier, where the outer carrier is inserted into the block assembly. Such an arrangement allowing for easy removal of the inner-assembly for replacement of a fuse without requiring removal of the outer carrier from engagement with the block assembly.

With attention to still a further advantage of the present invention, the outer carrier of the two part fuse assembly includes a fuse storage area where a replacement fuse is stored.

With attention to still a further advantage of the present invention, the block assembly and modules are configured to implement a plug-in bus connection for a contact alarm, eliminating the need for discrete wiring of such an alarm.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof, and wherein.

DETAILED DESCRIPTION OF THE PREFERRED EMBODIMENT

Figure 1A:
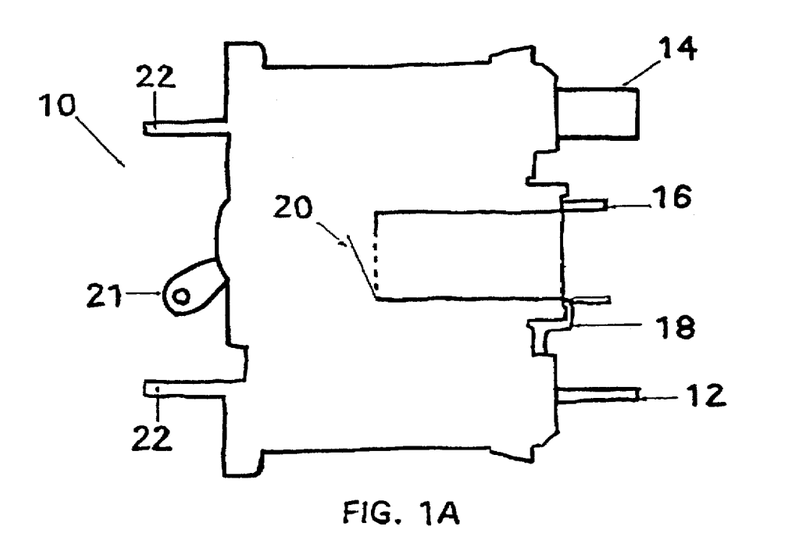
FIGS. 1A–1C illustrates a circuit breaker assembly according to the subject invention.

With attention to FIG. 1A, a circuit breaker module 10 includes line contact 12, load contact 14, and alarm contact 16. A jumper 18 provides a connection from line contact 12 to inner normally open switch 20. When an excessively high line current is sensed at line contact 12 or when circuit breaker lever 21 is manually moved, circuit breaker 10 is tripped, changing the state of circuit breaker module 10 from closed to open. When excessive current exists at line contact 14, jumper 18 passes current to normally open switch 20 causing switch 18 to close completing a path to alarm contact 16. The output from alarm contact 16 is then used to signal a high condition to a monitoring device (not shown). In an alternative embodiment circuit breaker 10 is configured such that an alarm is issued only when a breaker tripping event occurs and not when circuit breaker lever 21 is moved.

Circuit breaker module 10 further includes protection ledges 22 above and below circuit breaker lever 21. Ledges 22 protect against unintentional moving of lever 21 which would result in unintended tripping of circuit breaker module 10.

Figure 1B:
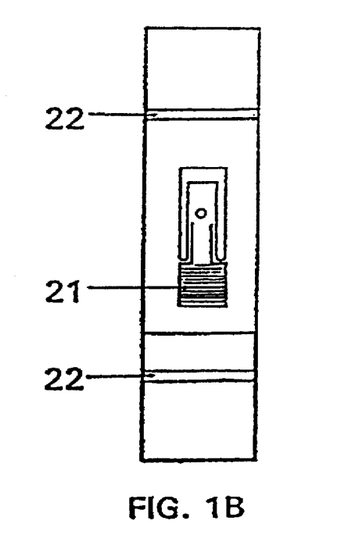
Figure 1C:
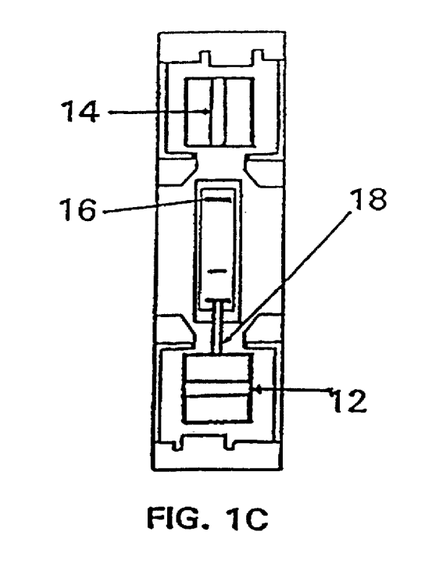

FIG. 1B sets forth a front view of protective ledges 22, and FIG. 1C illustrates that line contact 12 and load contact 14 are disposed perpendicular to each other, where line contact 12 and load contact 14 are stab-type connectors.

Figure 2A:
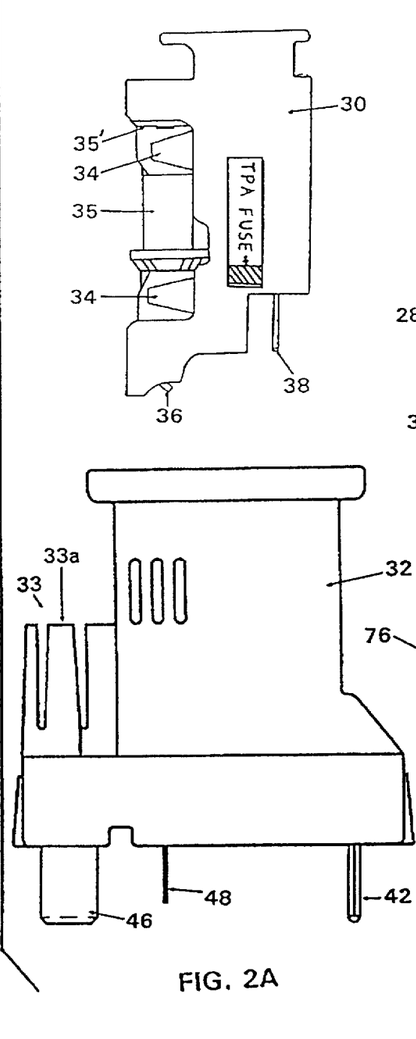
FIGS. 2A–2C sets forth an embodiment of the fuse module according to the subject invention.
Figure 2B:
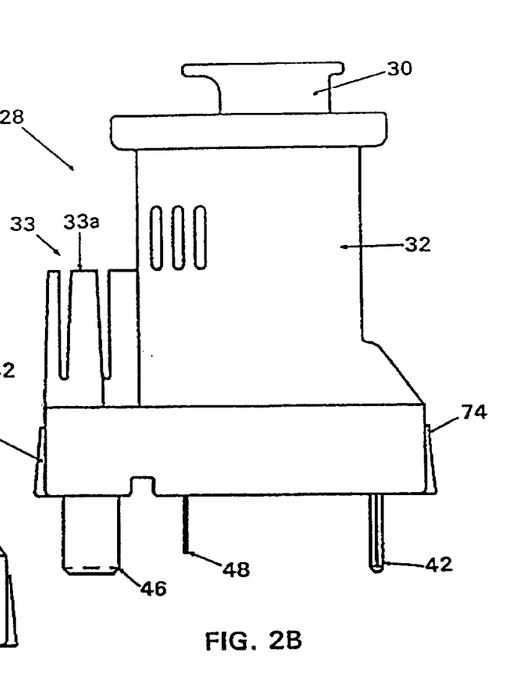

FIG. 2A illustrates two part fuse module 28 including internal fuse carrier (which may alternatively be called internal assembly) 30 which is to be inserted into outer carrier or housing 32, as exemplified in FIG. 2B. Returning attention to FIG. 2A, internal fuse carrier 30 includes fuse holding clips 34 which hold fuse 35 having a fuse pin 35', fuse connector prong 36 and internal line contact 38, extending out of the bottom of internal fuse carrier 30.

Integrated on outer carrier 32 is a replacement fuse carrier 33, designed to hold a replacement fuse to be carried with fuse module 28. Replacement fuse carrier 33 increases the efficiency of the modular DC distribution system A in that when a fuse needs to be changed, the replacement fuse is immediately at hand thereby minimizing the time and effort to obtain an appropriate sized fuse. Replacement fuse carrier 33 includes split flexible walls 33a which are flexed back when a replacement fuse is inserted and which provide secure holding of the replacement fuse as the resiliency of the split walls 33a also out to clamp onto the replacement fuse.

Figure 2C:
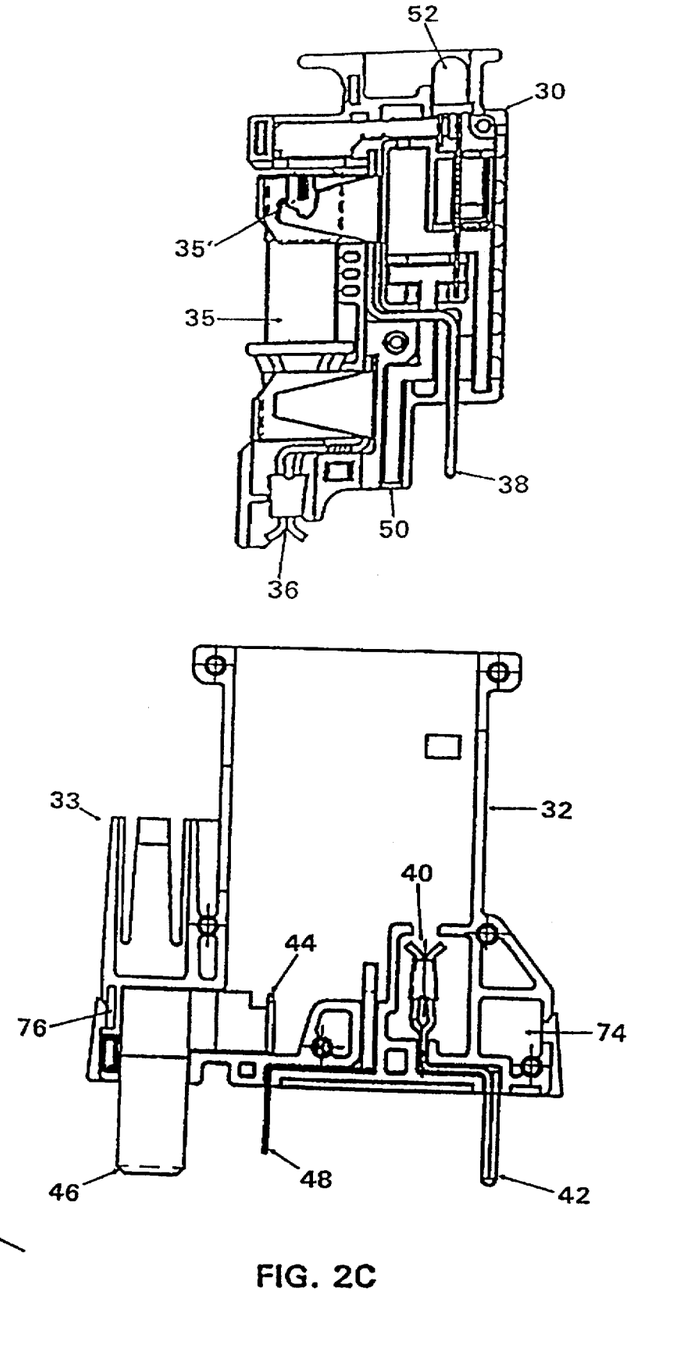

Turning attention to FIG. 2C, which provides cut-away views of internal fuse carrier 30 and outer carrier 32, the interconnections between these elements may be discerned more easily. Particularly, when inserted, internal line contact 38 makes a connection to internal line contact receiver 40 which in turn is connected to line contact 42. Fuse connector prong 36 is engaged with internal load contact receiver 44, which is connected to load contact 46. Alarm contact 48 makes contact with alarm contact 50, and when triggered provides a signal to LED 52. Specifically, when fuse 35 "blows", fuse pin 35' extends connecting line contact 38 to alarm contact 50 through LED 52 providing an alarm voltage on the alarm contact 50. Through this connection, the current flowing through the external alarm circuitry also flows through LED 52 providing a visual indication of a blown fuse.

While the above discussion has been directed to a two piece fuse module, a single piece fuse module could be implemented in accordance with the teachings of the present invention, i.e. one which is interchangeable with circuit breaker module 10.

Figure 3A:
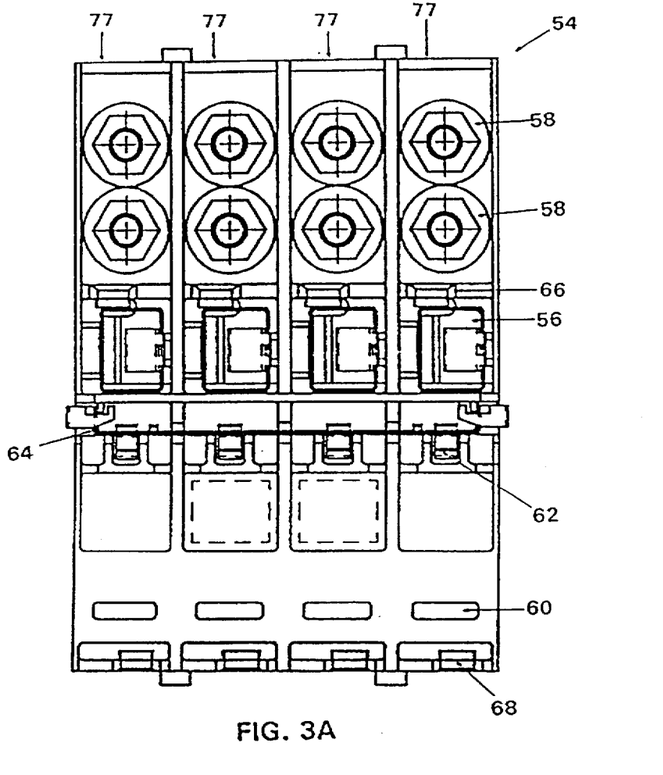
FIGS. 3A–3B illustrate the block assembly which carries the circuit breaker and fuse modules of 1A–1C and 2A–2C.

FIG. 3A is a top view of block assembly 54 designed to interchangeably carry circuit breaker module 10 and fuse module 28. Block assembly 54 includes block assembly load contacts 56 configured as spring biased receptacles which, as one of circuit breaker load contact 14 and fuse load contact 46 is inserted into the spring biased receptacle results in the engagement developing a strong electrical contact between the block assembly load contacts 56 and the load contact 14 (46). Each of the block assembly load contacts 56 are also in electrical connection with load connectors 58, which are a bolt and screw connection including lock washers, to which an external electrical line is securely fastened.

Block assembly 54 further includes block assembly apertures 60, sized to allow passage of circuit breaker line contact 12 and fuse line contact 42 through block assembly 54. As will be discussed in greater detail below, apertures 60 are arranged such that when line contacts 12 (42) pass therethrough they are able to receive power from a power source.

Block assembly alarm contacts 62 are arranged and configured for receipt of alarm contacts 16 (48). Alarm contacts 62 being constructed in a U-shaped spring configuration, and each electrically connected to other alarm contacts 62 through block alarm contact line 64.

Figure 3B:
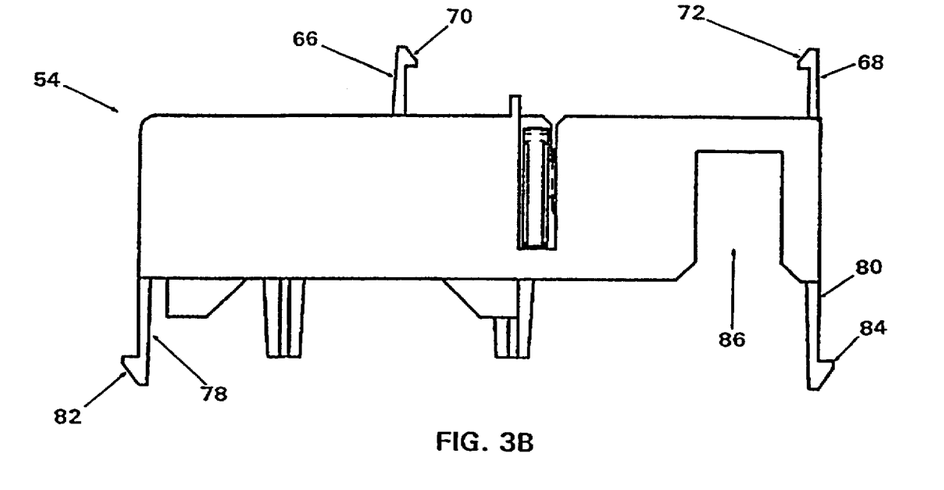

Turning attention to FIG. 3B, which is a side view of block assembly 54, this figure illustrates resiliently extending fingers 66 and 68 with claw portions 70 and 72 extending from upper portion of block assembly 54. Fingers 66 and 68 are distanced from each other such that when either one of circuit breaker module 10 and fuse module 28 is inserted into block assembly 54, claws 70 and 72 engage locking areas 74 and 76 (FIGS. 1A, 2B, 2C) of circuit breaker module 10 and fuse module 28.

It is noted that locking areas 74 and 76 on modules 10, 28 are located in substantially identical areas such that claws 70 and 72 engage both modules 10, 28 at the same location. This along with sizing modules 10 and 28 to have a width and length compatible with insertion in receiving areas 77 of block assembly 54 and locating of line contacts 12 (42), load contacts 14 (46) and alarm contacts 16 (48) in substantially identical locations allow for interchanging between modules 10 and 28 within receiving areas 77.

In FIG. 3B, resiliently extending fingers 66 and 68 appear as single fingers. However, as can be seen more clearly in FIG. 3A resilient fingers 66 and 68 are provided for each receiving area 77.

Returning attention to FIG. 3B, downwardly extending resilient fingers 78 and 80 are positioned facing outwardly of the block assembly 54 such that claws 80 and 82 face in a direction opposite claws 70 and 72. As will be described in greater detail below, resilient fingers 78 and 80 along with claws 82 and 84 permit fastening of block assembly 54 without the use of any tool, whereby the block assembly may be snapped into a locked engagement with a backing panel mounted within a modular DC distribution unit.

The mode of such mounting includes provision of openings in the backing panel corresponding to resilient fingers 78 and 80, sized to allow passage of claws 82 and 84 upon resilient legs 78 and 80 moving through the openings of the backing panel. The openings in the backing panel also sized to resist removal of the block assembly. It is to be appreciated, however, that legs 78 and 80 are of a resilient material which allows them to be flexed whereby claws 82 and 84 are moved back through the openings in the backing panel for removal of block assembly 54.

Figure 4A:
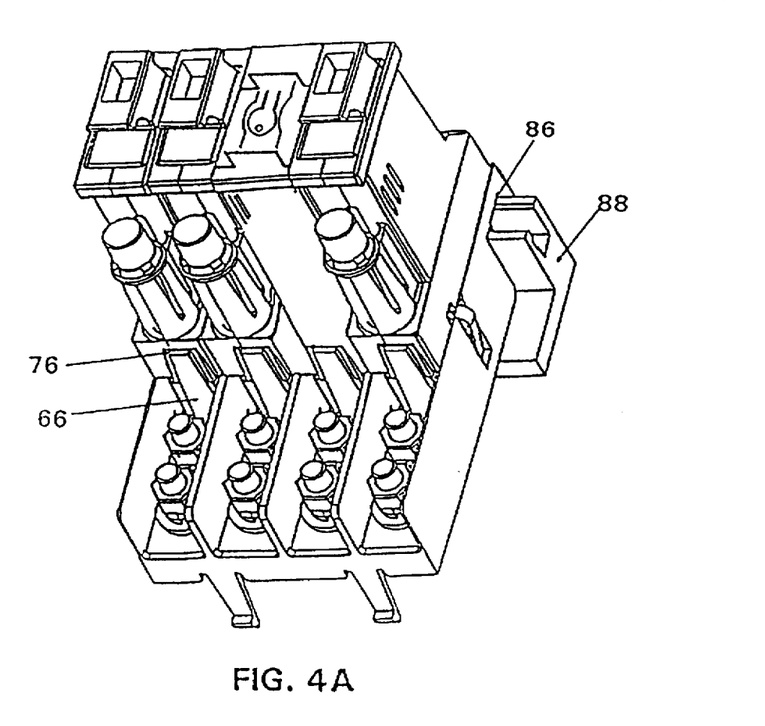
FIGS. 4A–4B graphically sets forth the circuit breaker and fuse modules interconnected with the block assembly which is in turn mated to the bus bar.

Block assembly 54 further includes a bus bar receiving section 86 where a properly sized bus bar, such as bus bar 88 of FIG. 4A, is received when block assembly 54 is properly mounted.

With further attention to FIG. 4A, circuit breaker modules 10 and fuse modules 28 are shown plugged or inserted into block assembly 54. In this position, resilient extending fingers 66 and 68 (shown in FIG. 3B) lock the modules into a secure engagement with block assembly 54 by having claws 70 and 72 snap into locking areas 74 and 76. When modules 10, 28 are to be removed from block assembly 54 the resilient legs 66, 68 may be flexed away from the modules 10, 28 disengaging claws 70, 72 from the locking areas 74 and 76. With at least one of claws 70, 72 disengaged removal force is applied to remove the module 10, 28. Line contacts 12 (42), load contacts 14 (46) and alarm contacts 16 (48) are also engaged with the corresponding receiving contacts in block assembly 54. Bus bar 88 which is secured in bus receiving section 86 will, in this configuration, be in contact with line contacts 12 (42) extending through block assembly apertures 60.

Figure 4B:
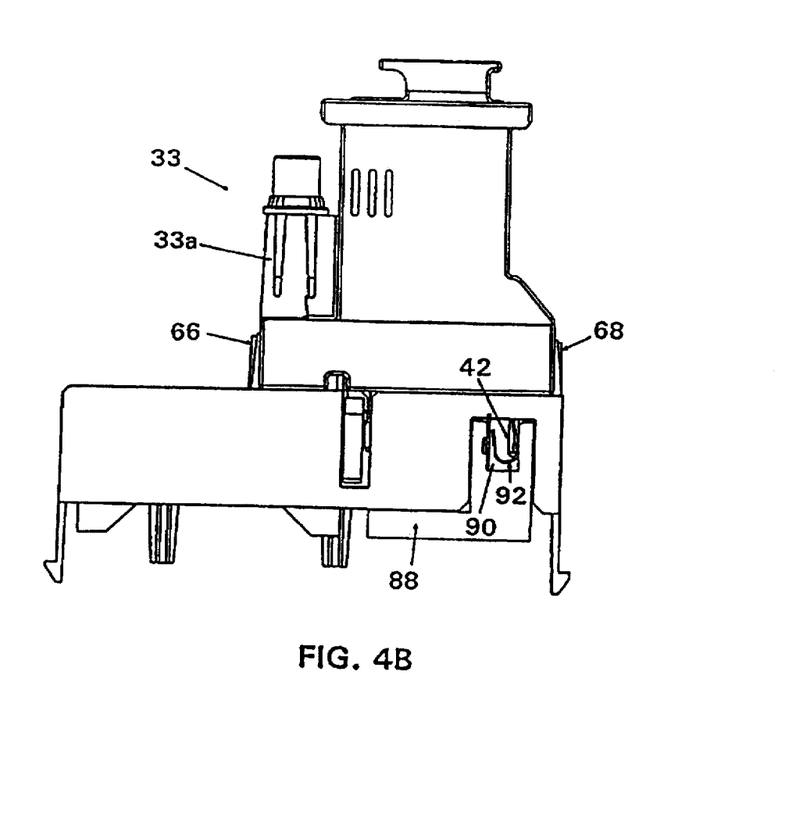

The above engagement is also shown in FIG. 4B. Particularly, line contact 42 of fuse module 28 is passed through aperture 60 (FIG. 3A) and into U-channel 90 of bus bar 88. It is noted that J-formed spring element 92 extends into the U-channel of bus bar 88. The J-formed spring element 92 is inserted in U-channel 90 to apply a tension between line contact 42 and bus bar 88 to provide a secure electrical contact between line contact 42 and bus bar 88.

Figure 5A:
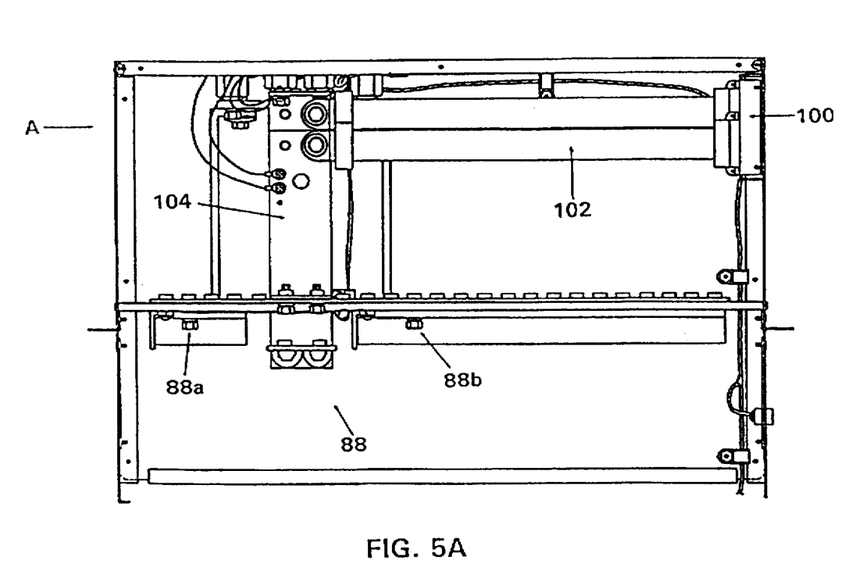
FIGS. 5A–5E detail the modular DC distribution unit according to the subject invention at various stages of assembly.
Figure 5B:
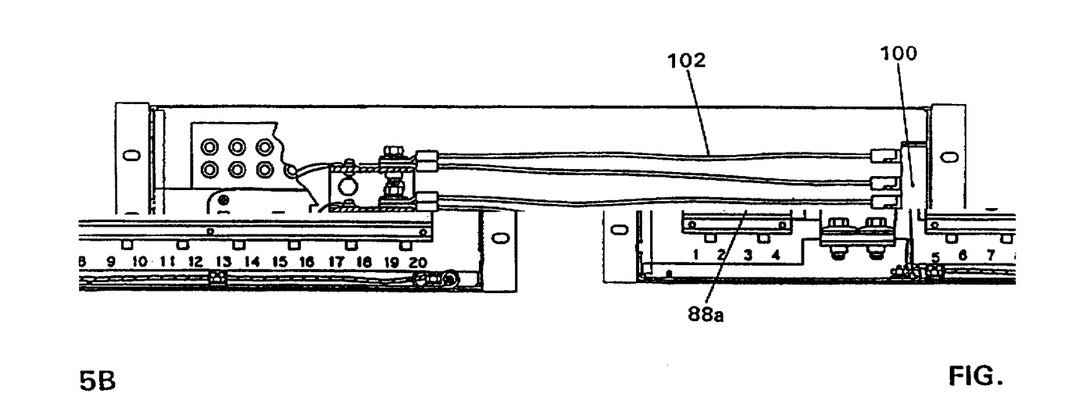

FIG. 5A is a top view of an interior of a modular DC distribution unit A according to the subject invention. DC distribution unit A includes input 100 which receives input power from a power source (not shown). Power cables 102 deliver the received power to connector 104. These interconnections are also shown in front partial cut-away view 5B. The input power from connector 104 is passed to bus bar 88, which is a split configuration bus bar system having power delivered to bus bar section 88a and section 88b. The power delivered to the split bus bar 88 can be of different values to each of sections 88a and 88b.

Figure 5C:
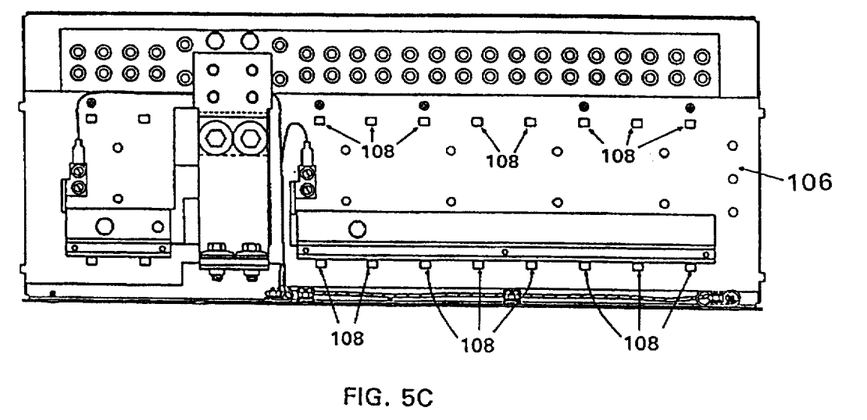

As can be seen with more particularity in FIG. 5C, modular DC distribution unit A includes backing panel 106 preferably constructed from a non-metallic, non-conducting material. Within backing panel 106 are openings 108 sized for receipt of claws 70 and 72 of resilient extending fingers 66 and 68 of block assembly 54. It is to be appreciated that while in the previous figures, block assembly 54 was shown as having four receiving areas 77 a block assembly is configurable having either more or less than this number. In FIG. 5B, there are 1–20 intended receiving areas. Since the explanatory modular DC distribution unit A includes a split bus bar at least two block assemblies 54 will be mounted to backing panel 106 having different numbers of receiving areas 77.

Block assembly 54 is mounted to backing panel 106 through openings 108 in a manner previously discussed. When properly mounted, block assembly apertures 60, of block assembly 54, are located over U-channel 90 of bus bar 88, which is within bus bar receiving section 86. Thus, if one of the block assemblies 54 needs to be removed, it is not necessary to remove bus bar 88. Rather, only the desired block assembly 54 is removed and the bus bar remains.

Shunt 112 picks off a portion of the current being distributed in modular DC distribution unit A and is transmitted to an external monitoring device.

Figure 5D:
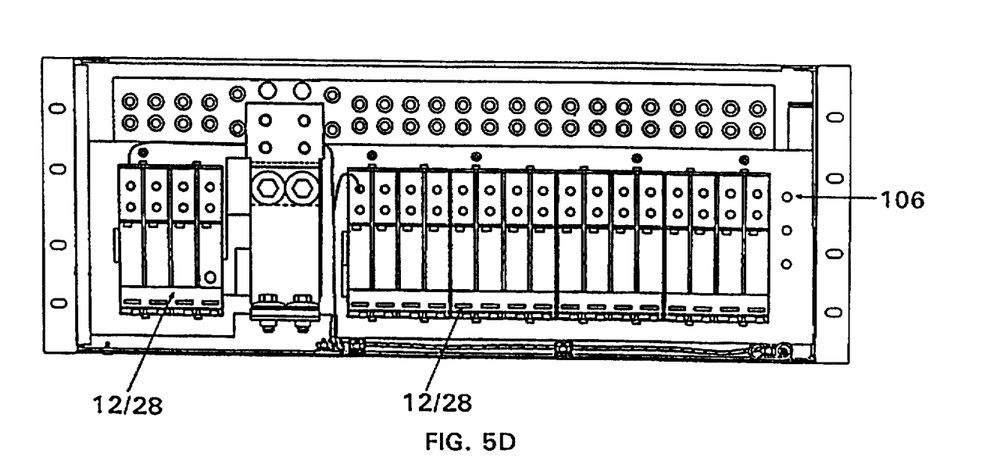

FIG. 5D provides a more complete front view of the modular DC distribution unit A, where block assembly 54 has been mounted to backing panel 106 and a plurality of modules 10, 28 are mounted in receiving areas 77 of block assembly 54.

Figure 5E:
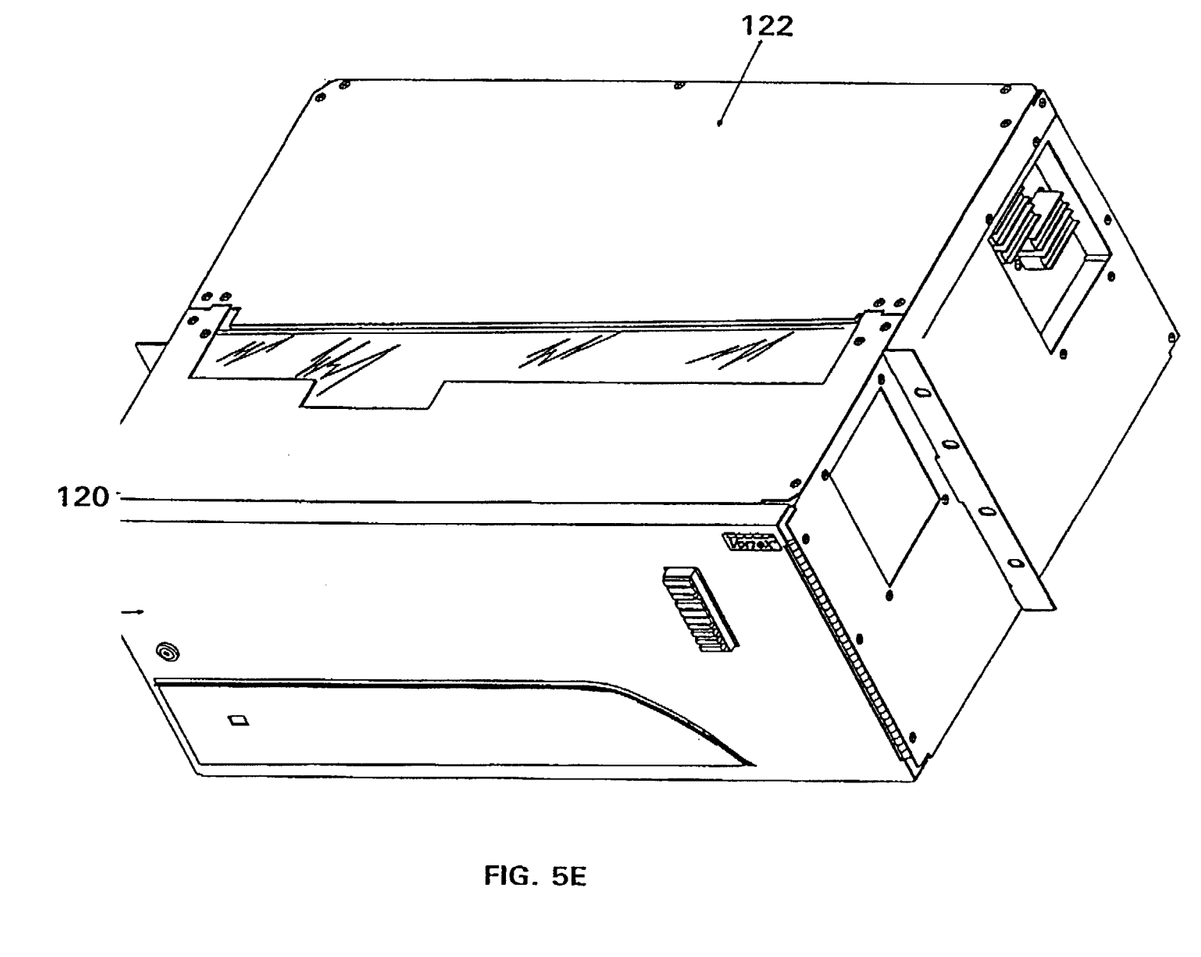

FIG. 5E is a view of a fully assembled modular DC distribution unit A including a front cover panel 120 and additional covers 122 enclosing the above discussed elements within the cabinet.

Figure 6A:
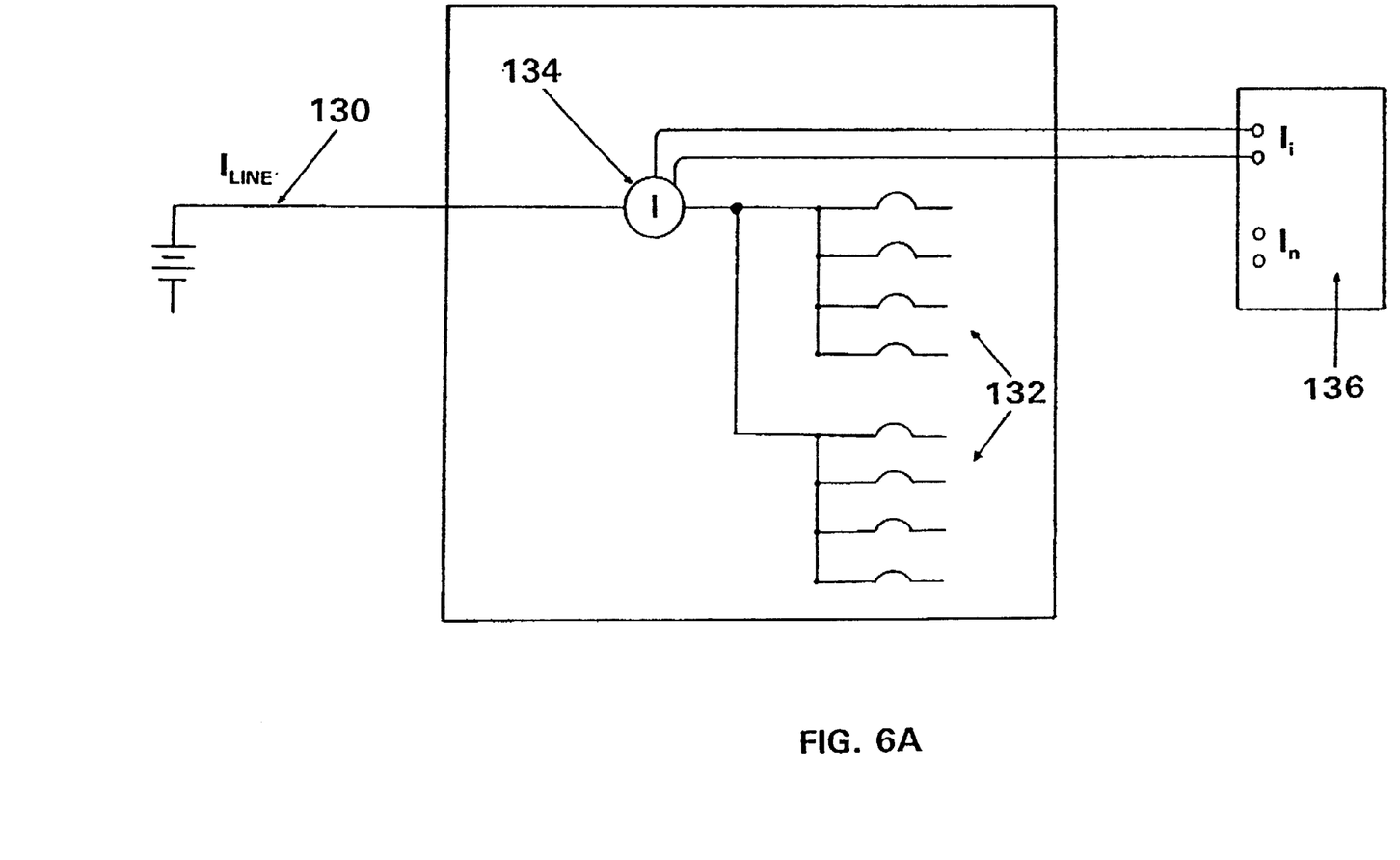
FIG. 6A illustrates a distribution network according to the prior art wherein a plurality of circuit breakers and fuses are connected in a non-modular arrangement.

In power distribution systems, it is often useful to obtain a shunt current that is passed to a monitoring device in order that the status of the system can be observed. If the system is not working properly, the monitored current can be used to inform an operator allowing corrective action to be taken. With attention to FIG. 6A, in existing DC power distribution networks the main current line 130 is used to power the variety of circuit breakers and fuses 132. Shunt 134 is used to obtain a shunt current from main current line 130, and needs to be sized for the total system shunt current and delivered to monitor 136 which includes a number of current monitoring points Ii–In. These monitoring points are needed since if additional distribution units are used, each needs its own connection to the monitor unit 136. Therefore, if the system were expanded additional shunts each having individual lines to monitor unit 136 are needed.

Figure 6B:
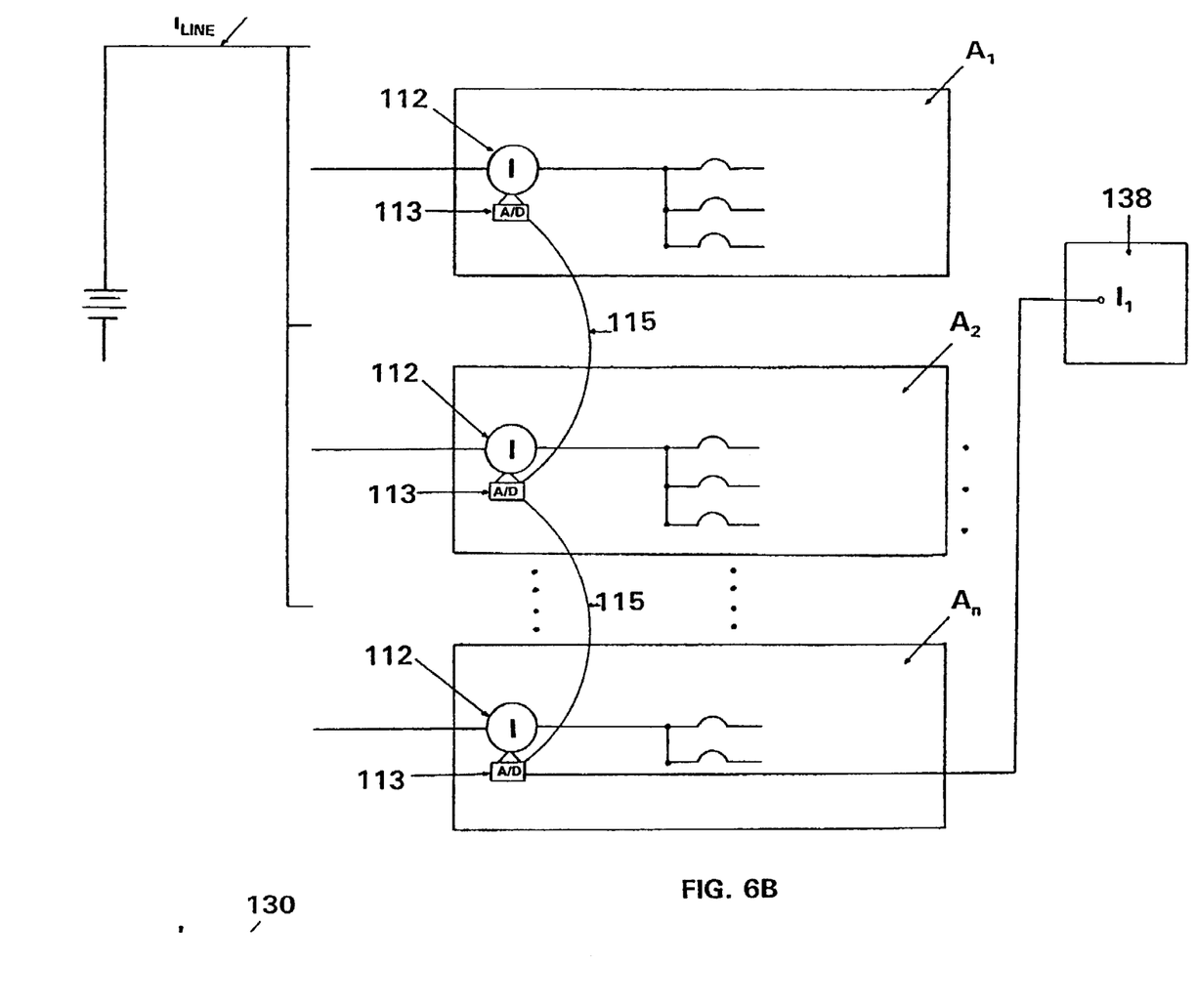
FIG. 6B illustrates a DC distribution assembly including a plurality of modular DC distribution units each of which outputs its own shunt signal.

With attention to FIG. 6B, in the present invention, each modular DC distribution unit $A_1$-$A_n$ has its own shunt 112, connected to a corresponding shunt module 113, which includes an analog to digital (A/D) converter and associated control circuitry. Shunt module 113 converts the analog shunt signal from shunt 112 to a digital signal that is transmitted to monitor unit 138. Using the A/D converter and control circuitry of shunt module 113, signal line 115 may be "daisy-chained" from one shunt module to others in a system, allowing for a simplicity of expansion when numerous modular DC distribution units $A_1$-$A_n$ are used. Each shunt module 113 is configured to allow transmission of digital data from a preceding shunt module 113. For example, digital data from shunt module 113 of distribution unit $A_1$ is passed to distribution $A_2$, and both of the digital signals from distribution units $A_1$, $A_2$ are transmitted to distribution unit $A_n$, whereafter all digital signals are provided to monitor unit 138. Monitor unit 138 is then used to interpret the digital signals, including the addition of individual values to obtain a total system current.

Using the above construction, when additional modular DC distribution units are added, it is not necessary to rewire the network to transmit a separate shunt signal to individual monitoring points, since the shunt output of the added modular DC distribution unit will simply be linked to the shunt outputs of existing modular units. It is to be appreciated that certain aspects of the invention may be implemented where analog signals are provided directly to a monitor unit.

The invention has been described with reference to the preferred embodiment. Obviously, modifications and alterations will occur to others upon a reading and understanding of this specification. It is intended to include all such modifications and alterations insofar as they come within the scope of the appended claims or the equivalence thereof.

Having thus described the invention, it is now claimed:

1. A modular DC distribution unit comprising:
  a cabinet having an interior cavity;
  a power input configured in the cabinet, to input power to the cabinet from an external power source;
  power cables having first and second ends, the first end connected to the power input;
  a power distribution connector having a receiving terminal and a transmitting terminal, the receiving terminal connected to the second end of the power cables;
  a backing panel attached in a vertical plane on the interior of the cabinet, the backing panel having a plurality of spaced openings which are provided in pairs, one of each pair located near a top edge of the backing panel and one of each pair near a bottom edge of the backing panel;
  a bus bar, connected to a surface of the backing panel, having a U receiving area, the bus bar powered through a connection to the transmitting terminal of the power distribution connector;
  a block assembly having a plurality of spaced claws carried on resilient legs extending from a bottom surface of the block assembly, the claws sized to allow passage through the spaced openings of the backing panel upon insertion, and to provide resistance to removal from the spaced openings, allowing connection to the backing panel by tool-less insertion, the block assembly having block assembly load contacts, load connectors, block assembly apertures and pairs of claws carried on resiliently extending legs, all located on an upper surface of the block assembly, the apertures of the connected block assembly aligned over the bus bar;
  a circuit breaker module having a load contact formed for insertion into the block assembly load contacts, and a line contact formed for insertion through the block assembly apertures and into contact with the bus bar; and
  a fuse module having a load contact formed for insertion into the block assembly load contacts, and a line formed for insertion through the block assembly apertures, and into contact with the bus bar.

2. The modular DC distribution unit according to claim 1 wherein the block assembly includes a bus bar receiving section, aligned below the block assembly apertures, wherein upon insertion of the block assembly a U-channel of the bus bar is contained within the bus bar receiving section.

3. The modular DC distribution unit according to claim 1 wherein the upper surface of the block assembly is configured into pre-defined receiving areas having dimensions to receive one of either the circuit breaker module and the fuse module.

4. The modular DC distribution unit according to claim 1 wherein the fuse module is a two element device including an inner assembly and an outer carrier, the inner assembly sized to fit into an internal area of the outer carrier and including (i) fuse holder clips for holding a fuse, (ii) a fuse connector prong, and (iii) an internal line contact, the outer carrier including (i) a load receiving contact connected on a first end to the fuse connector prong and connected on a second end to the fuse load contact, and (ii) a line receiver contact connected on one end to the internal line contact and a second end to the fuse line contact.

5. The modular DC distribution unit according to claim 4 wherein the outer carrier of the fuse module further includes a replacement fuse carrier, for carrying a replacement fuse.

6. The modular DC distribution unit according to claim 1 further including a shunt module including an analog to digital converter and control circuitry which converts an analog current into a digital current.

7. The modular DC distribution unit according to claim 6, wherein the shunt module is configured to be connected to a second shunt module and the outputs of the shunt modules combined.

8. The modular DC distribution unit according to claim 1, the block assembly further including block assembly alarm contacts and a block assembly alarm line, wherein the alarm line connects to each of the alarm contacts; and
  the circuit breaker module further including a circuit breaker alarm contact sized to be inserted into any one of the block assembly alarm contacts and the fuse module further including a fuse alarm contact sized to be inserted into any one of the block assembly alarm contacts.

9. The modular DC distribution unit according to claim 1 wherein the bus bar is a split power bus bar.

10. The modular DC distribution unit according to claim 1 wherein the circuit breaker module and fuse module each include locking areas in substantially identical locations with reference to the resilient extending legs on the upper surface of the block assembly.

11. The modular DC distribution unit according to claim 1 further including a J-shape spring element in a U-channel of the bus bar.

12. The modular DC distribution unit according to claim 1 wherein the backing panel is made of a non-metallic material.

13. The modular DC distribution unit according to claim 9 wherein the locking areas and claws are configured such that application of removal force on the legs disengages the claws from the locking areas.

14. A distribution system comprising:

a power source; and, a plurality of modular DC distribution units each including, a cabinet having an interior cavity;

a power input configured to input power to the cabinet from the power source;

power cables having first and second ends, the first end connected to the power input;

a power distribution connector having a receiving terminal and a transmitting terminal, the receiving terminal connected to the second end of the power cables;

a backing panel attached in a vertical plane on the interior of the cabinet, the backing panel having a plurality of spaced openings which are provided in pairs, one of each pair located near a top edge of the backing panel and one of each pair near a bottom edge of the backing panel;

a bus bar, connected to a surface of the backing panel, having a receiving area, the bus bar powered through a connection to the transmitting terminal of the power distribution connector;

a block assembly having a plurality of spaced claws carried on resilient legs extending from a bottom surface of the block assembly, the claws sized to allow passage through the spaced openings of the backing panel upon insertion, and to provide resistance to removal from the spaced openings, allowing connection to the backing panel by tool-less insertion, the block assembly having block assembly load contacts, load connectors, block assembly apertures and pairs of claws carried on resiliently extending legs, all located on an upper surface of the block assembly, the apertures of the connected block assembly aligned over the bus bar;

a circuit breaker module having a load contact formed for insertion into the block assembly load contacts, and a line contact formed for insertion through the block assembly apertures and into contact with the bus bar; and a fuse module having a load contact formed for insertion into the block assembly load contacts, and a line formed for insertion through the block assembly apertures, and into contact with the bus bar.

15. The distribution system according to claim 14 wherein each DC distribution unit includes a shunt module including an analog to digital converter and control circuitry which converts an analog current into a digital current.

16. The distribution system according to claim 15, wherein the shunt module is configured to be connected to a second shunt module and the outputs of the shunt modules combined.

17. The distribution system according to claim 15 wherein the upper surface of the block assembly is configured with predefined receiving areas having dimensions to receive one of either the circuit breaker module and the fuse module.

18. The distribution system according to claim 15 wherein the fuse module is a two element device including an inner assembly and an outer carrier, the inner assembly sized to fit into an internal area of the outer carrier and including (i) fuse holder clips for holding a fuse, (ii) a fuse connector prong, and (iii) an internal line contact, the outer carrier including (i) a load receiving contact connected on a first end to the fuse connector prong and connected on a second end to the fuse load contact, and (ii) a line receiver contact connected on one end to the internal line contact and a second end to the fuse line contact.

19. The distribution system according to claim 15 wherein the circuit breaker module and fuse module each include locking areas in substantially identical locations with reference to the resilient extending legs on the upper surface of the block assembly.

20. A modular DC distribution unit comprising:

a backing panel attached in a vertical plane on the interior of the cabinet, the backing panel having a plurality of spaced openings;

a bus bar including a receiving area, connected to a surface of the backing panel;

a block assembly having a plurality of spaced claws carried on resilient legs extending from a bottom surface of the block assembly, the claws sized to allow passage through the spaced openings of the backing panel, and to provide resistance to removal from the spaced openings, allowing connection to the backing panel by tool-less insertion, the block assembly having block assembly load contacts, load connectors, block assembly apertures and pairs of claws carried on resiliently extending legs, located on an upper surface of the block assembly, the apertures of the connected block assembly aligned over the bus bar;

a circuit breaker module having a load contact formed for insertion into any one of the block assembly load contacts, and a line contact formed for insertion through the block assembly apertures and into contact with the bus bar; and a fuse module having a load contact formed for insertion into any one of the block assembly load contacts, and a line formed for insertion through the block assembly apertures, and into contact with the bus bar wherein the circuit breaker module and the fuse module are interchangeable in the block assembly.

* * * * *

UNITED STATES PATENT AND TRADEMARK OFFICE
CERTIFICATE OF CORRECTION

PATENT NO. : 5,726,852
DATED : March 10, 1998
INVENTOR(S) : Richard E. Trifiletti, et al It is certified that error appears in the above-identified patent and that said Letters Patent is hereby corrected as shown below:

<u>IN THE DRAWINGS</u>

Delete Drawing Sheets 6, 8, and 10, and substitute therefor the Drawing Sheets consisting of FIGS. 5A, 5B, 5E, and 6B, as shown on the attached pages.

Signed and Sealed this

Third Day of November, 1998

Attest:

Attesting Officer

BRUCE LEHMAN

Commissioner of Patents and Trademarks